H. R. NEVENS & R. MARCY.
TRAIN CONTROL APPARATUS.
APPLICATION FILED JUNE 3, 1915.
1,299,753.
Patented Apr. 8, 1919.
3 SHEETS—SHEET 1.
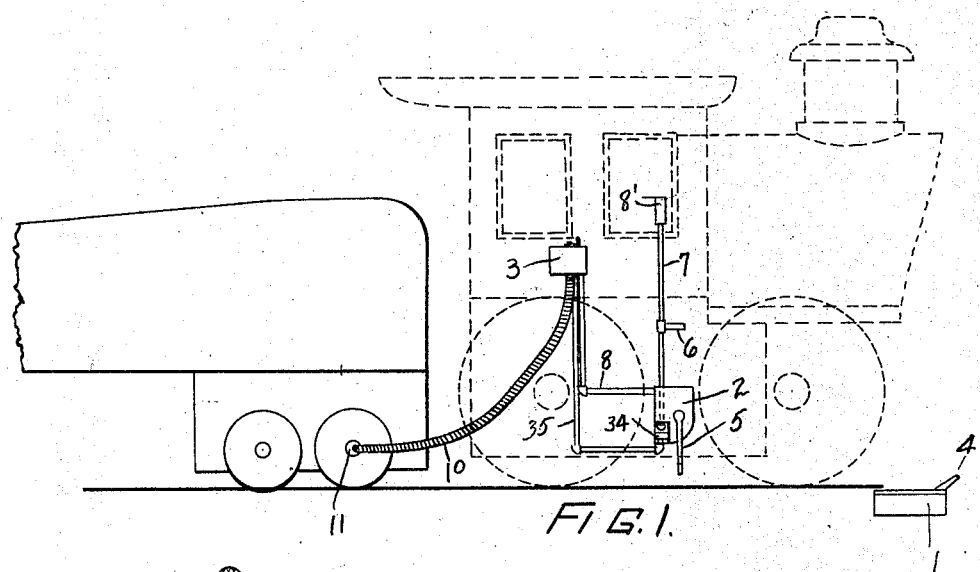
FIG. 1.
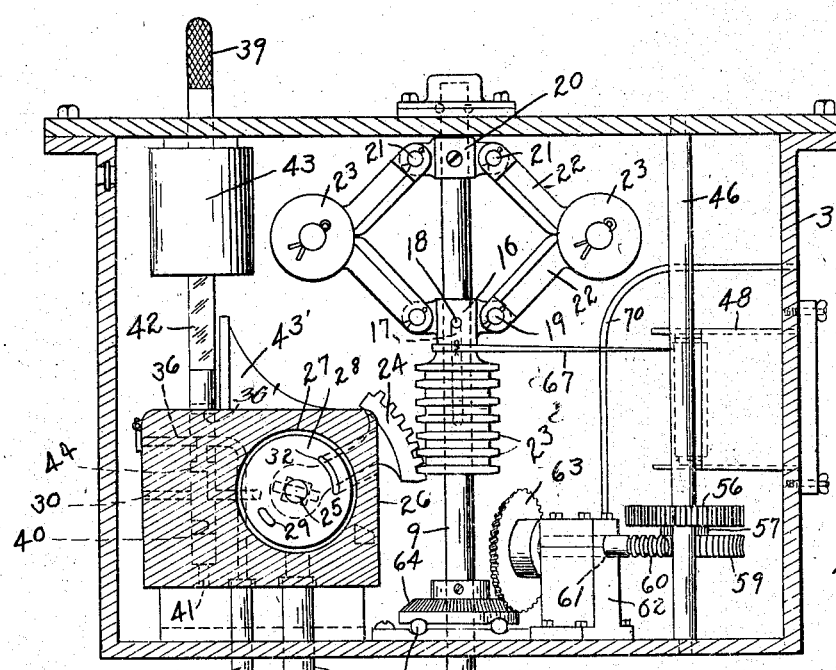
FIG. 2.
FIG. 12.
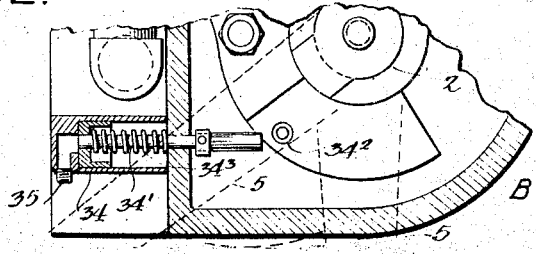
INVENTORS
RICHARD MARCY
HERBERT R. NEVENS
BY
ATTORNEY H. R. NEVENS & R. MARCY.
TRAIN CONTROL APPARATUS.
APPLICATION FILED JUNE 3, 1915.

1,299,753.

Patented Apr. 8, 1919.
3 SHEETS—SHEET 2.

INVENTORS
RICHARD MARCY
HERBERT R. NEVENS
BY
ATTORNEY

H. R. NEVENS & R. MARCY.
TRAIN CONTROL APPARATUS.
APPLICATION FILED JUNE 3, 1915.
1,299,753.
Patented Apr. 8, 1919.
3 SHEETS—SHEET 3.
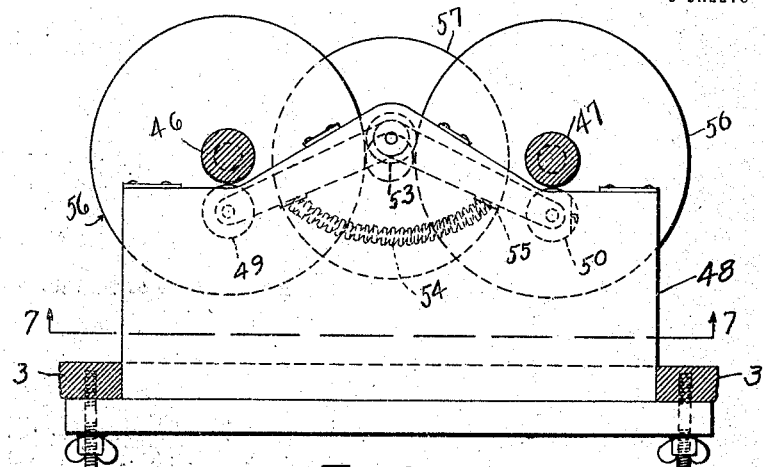
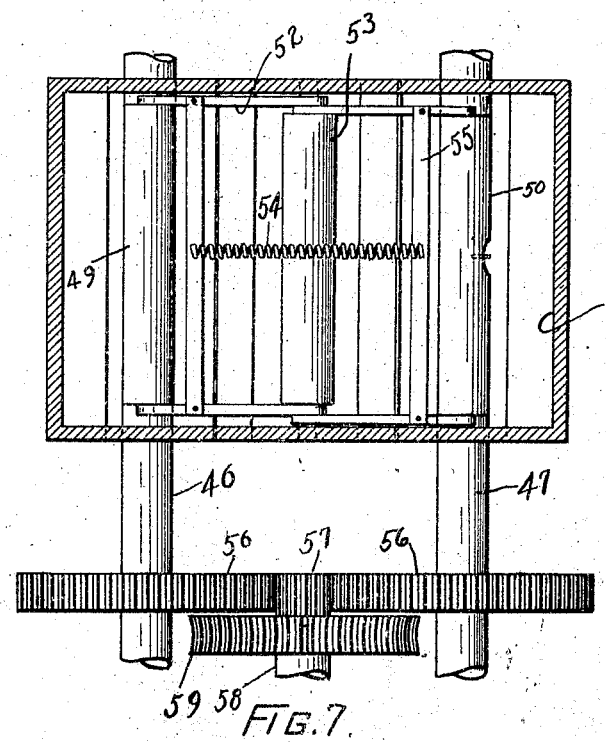
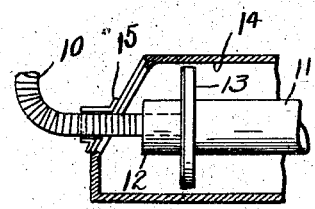
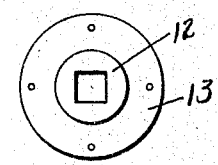
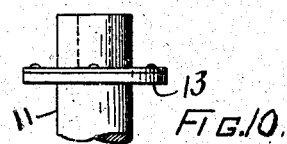
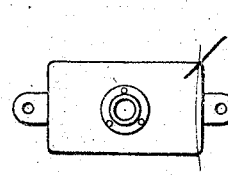
INVENTOR
RICHARD MARCY
HERBERT R. NEVENS
by Titus Spear Jr.
ATTORNEY

UNITED STATES PATENT OFFICE.

HERBERT R. NEVENS, OF DORCHESTER, AND RICHARD MARCY, OF ALLSTON, MASSACHUSETTS, ASSIGNORS TO NEVENS-WALLACE TRAIN CONTROL COMPANY, A CORPORATION OF MASSACHUSETTS.

TRAIN-CONTROL APPARATUS.

1,299,753.  Specification of Letters Patent.  Patented Apr. 8, 1919.

Application filed June 3, 1915. Serial No. 31,910.

*To all whom it may concern:*

Be it known that we, HERBERT R. NEVENS and RICHARD MARCY, citizens of the United States, residing at Dorchester, county of Suffolk, Commonwealth of Massachusetts, and Allston, county of Suffolk, Commonwealth of Massachusetts, respectively, have invented certain new and useful Improvements in Train-Control Apparatus, of which the following is a specification.

This invention relates to the positive control of railroad trains and the like for the purpose of preventing neglect or disobedience of the usual signals employed in such systems. The invention is particularly adapted to be used in block systems where trains are to be kept absolutely within certain limits, although obviously is capable of other use.

There are three principal features involved in the problem on train control: first the automatic setting of brakes on passing a given point in order to positively prevent the entry of the train into a zone of danger; second, the application of the brakes in a manner which shall be effective to bring the train to a stop whatever the speed but with the least possible shock, and wear; and third, the resumption of control by the engineer in order that he may move his train just as soon as the danger is over or provision for safety is made. This control of the engineer must of course not be of such a nature as to nullify the positive nature of the stop so that carelessness, recklessness or accident could be effective but should only permit of the dominance of the mind when exerted in a deliberate act after the action of the automatic means has effected the warning condition which necessitates thought and action in order to make procedure possible.

The system is capable of various modifications as to its means but for the purposes of disclosure and discussion in this case reference is made to the form of devices illustrated. These consist of three related mechanisms; a track box in which the track obstacle is located, an engine box in which the obstacle actuated trip and associated mechanism for reducing the pressure in the train line pipe whereby to cause a brake application is carried, and a cab box in which the mechanism for controlling the degree of brake application and for resetting the parts is located.

The present invention relates particularly to what is termed the cab box equipment, and has for its chief object to provide means for positively stopping the train upon actuation of the train carried trip by a track obstacle set at danger, and for resetting the train carried trip by the very medium which causes a brake application.

The automatic control of the degree of brake application is divided into two phases or conditions of actuation, first a phase for slow speeds up to a predetermined rate, say fifteen miles per hour, and second for higher speeds as above that rate. The voluntary control by the engineer is only effective or dominant at the slower speeds or during what has been called the first phase. In the illustrative embodiment set forth herein this control is a resetting device by which the escaping air is made to restore the mechanism which caused its release usually a valve. This may at lower speeds be immediately operated as soon as the automatic stop gives its first indication of actuation, as by the sound of a whistle set in the path of the escaping air; or it may be operated after the train has come to a more complete stop.

This mechanism is so related to the brake applying mechanism that the engineer can not forget to reset the train carried trip immediately after the train has been brought to a stop and can not start his train until the parts are reset.

A further object of the present invention is to record in a permanent form the varying speeds at which a train runs during a particular trip. This speed recording mechanism will therefore not only indicate the speed at which a train was traveling when it ran past a signal set at danger, but will show the different rates of speed which it made during a complete run.

These and other features which will appear more completely hereinafter are secured in the mechanism forming the subject matter of the present invention. The construction and operation of this invention will be more fully described in the specification which follows. In the drawings forming a part of that specification we have shown a practical embodiment of our invention which clearly illustrates the principle and structure thereof.

Throughout specification and drawings like reference numerals are correspondingly applied and in these drawings:

Figure 1 is an elevation of a sufficient portion of a locomotive and tender to illustrate the assembly and general relation of our invention.

Fig. 2 is a section through the cab box showing the parts in brake applying position.

Fig. 6 is a plan section of the speed recording mechanism.

Fig. 7 is a detail section thereof on the line 7—7 of Fig. 6.

Figure 4:
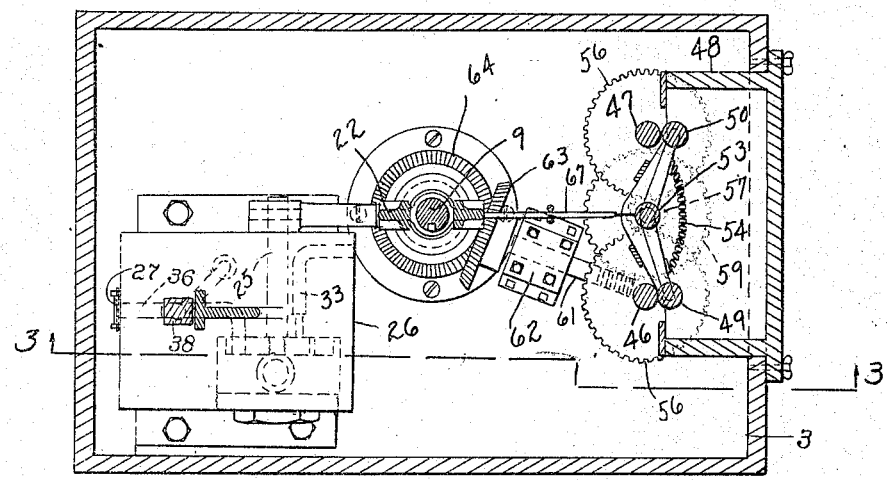
Fig. 4 is a detail section on the line 4—4 of Fig. 3.

Figs. 8 to 11 inclusive are detail views illustrating a preferred form of connection at the axle of the tender for the flexible driving shaft of the speed governed relief, and Fig. 12 is a detail view illustrating a portion of the system reclosing mechanism.

The train control system of which our present invention is a related part includes a track box 1 disposed adjacent to a rail, an engine box 2 and a cab box 3. Associated with the track box is a track obstacle 4 which is normally maintained in non-actuating relation to a train carried trip 5 mounted in the engine box 2 by suitable mechanism forming no part of the present invention. The trip 5 when effectively actuated by a track obstacle set at danger releases a valve in the box 2 controlling the pressure in the train line pipe, to effect an application of the brakes. The cab box 3 contains mechanism for securing a brake application according to the speed of the train, mechanism for recording the train speed, and mechanism for reclosing the train line system.

The mechanism for securing a brake application in proportion to the speed at which the train is traveling when the track obstacle is struck consists essentially of a speed governed relief operatively connected with the exhaust of the valve which controls the train line pressure and continuously in position for the proper relief at any particular time.

We have indicated at 6 the train line pipe which is connected with the pipe 7 leading from the engineer's valve 8' in the cab. The pipe 7 is controlled by a valve, not shown, within the engine box 2 and opening with the pressure. The valve is normally held to its seat against the pressure by suitable holding mechanism within the box actuated by the tripper 5. This mechanism forms no part of the present invention except in so far as it combines with the other features of the invention. When the valve in the engine box is unseated, the pressure in the train line pipe is relieved whereby to cause a brake application. The degree of relief of the pressure is controlled by speed governed mechanism located in the cab box 3 and continuously effective to secure a venting of the pressure in proportion to the train speed.

The unseating of the valve places the pipes 7 and 8 in communication so that the pressure flows from the train line pipe 6 through pipes 7 and 8 into the cab box 3. The degree of exhaust of the pressure within the box 3 is controlled by a valve construction located in said box and arranged to be opened and closed by mechanism continuously driven from the car axle at train speed.

This mechanism consists of a shaft 9 journaled in suitable bearings in the box 3 and a flexible connection 10 from said shaft to one of the axles 11 of the locomotive tender. The particular connections for the flexible shaft 10 at the axle 11 are shown in detail in Figs. 8 to 11 inclusive. This particular form of connection consists of a socket plate 12 secured to a disk 13 carried on the end of the axle 11 within the journal box 14. The opening of the journal box is covered by a plate 15 having an opening therein through which the end of the flexible shaft passes to the socket plate 12. This form of drive from the axle is considered desirable over a beveled gear drive for the reason that a more positive drive is possible.

Mounted on the shaft 9 to turn therewith is a sleeve 16. The sleeve 16 has guided sliding travel on said shaft by any suitable guiding connection as the slot 17 in the shaft and the pin 18 on the sleeve. Pivoted to the upper end of the sleeve as indicated at 19 and to a collar 20 fast on the shaft 9, as indicated at 21, are links 22 carrying weights 23. The weighted arms 23 therefore constitute a centrifugally acting device rotating with the shaft 9 at a speed equal to the speed of the train axle.

In practice it is found desirable to have the parts so related that the centrifugally acting device will not become effective to raise the sleeve 16 on the shaft 9 sufficiently to destroy the registration of the vent 29 with the port 30 of the relief mechanism when said shaft is rotating at all speeds less than a predetermined speed, usually fifteen miles an hour. When this predetermined speed is exceeded, the centrifugal force developed by the rapidly rotating shaft 9 causes the centrifugally acting members 22 to assume a relatively horizontal position. This draws the sleeve 16 up along the shaft 9 and through a relief construction which will now be described vents the train line pipe to a proper degree proportionate to the speed at which the train is traveling so that a proper brake application is secured.

This relief mechanism consists of an actuating device on the sleeve 16 and a valve operating device controlling the vent of air in the pipe 8 leading from the engine box. The actuating device on the sleeve 16 preferably consists of a plurality of circumferentially disposed spaced rings 23 with which engage the teeth of a gear segment 24 mounted on a shaft 25 journaled in a casting 26 supported within the cab box 3. The casting 26 is cored as indicated at 27 to provide an annular valve chamber in which is located a valve disk 28 fixed on shaft 25 of the gear segment 24. The pipe 8 leads into the valve chamber 28'.

The valve disk 28 has a relatively short port 29 normally disposed for registry with a normally unobstructed exhaust passage 30 cored in the casting 26 and leading from said port to the outer face of the casting within the engine box 3. If the trip 5 of the train traveling at a speed below the predetermined speed at which the centrifugally acting device 22 is set to close port 29 and open port 33 contacts a track obstacle set at danger position, the centrifugally acting device is not sufficiently actuated to cause the valve disk 28 to revolve sufficiently to destroy the registry of the vent 29 with the port 30. The trip 5 is actuated, however, and the valve within the engine box is unseated to admit the train line pressure through the pipe 8 into the valve chamber 27 and from thence through port 29 and passage 30 into the interior of the box 3. This causes a reduction in the train line pressure and a predetermined minimum brake application.

The air thus admitted into the box 3 escaped through a vent 31 in a wall of the box to the outside air. The hissing noise made by the escaping air through the vent 31 warns the engineer that a track obstacle set at danger position has been struck and the engineer is supposed to immediately reset the trip arm 5 to its original position. If the engineer does not heed this signal, the train line pressure simply continues to be exhausted. If considered desirable a whistle or other signal device may be employed in connection with the vent 31 to positively warn the engineer that he has run past a danger signal. The resetting apparatus will be described later in connection with the parts which it operates.

The valve disk 28 has a relatively long port 32 which is adapted to be brought in registry with an exhaust passage 33 cored in the casting 26 and venting into the cab box 3 upon an actuation of the train carried trip 5 when the train is traveling at a speed in excess of the predetermined speed for which the centrifugally acting mechanism is set.

The port 32 is so related to the port 29 that one port is always in registration with its corresponding exhaust passage and is such that the port 32 begins to register with the exhaust passage 33 at the very moment that the port 29 moves out of registration with the passage 30 upon a rotation of the valve disk 28. This insures that the pressure will be relieved at all speeds of the train.

If the trip 5 of a train traveling at a speed in excess of the predetermined speed at which the centrifugally acting device 23 operates to destroy the venting relation of vent 29 with port 30, strikes a track obstacle, the trip 5 is positively actuated to unseat the valve in the engine box 2 to permit passage of the air through the pipe 8 into the valve chamber 27. At this rate of speed the centrifugally acting device 23 has raised the sleeve 16 to a height proportionate to the train speed and this movement of the slide 16 upwardly has through the operating device 23 and gear segment 24 effected a corresponding rotation of the valve disk 28 thereby moving the port 32 into partial or full registration depending upon the train speed, with the exhaust passage 33 whereby to secure a venting of the pressure according to the train speed.

Figure 3:
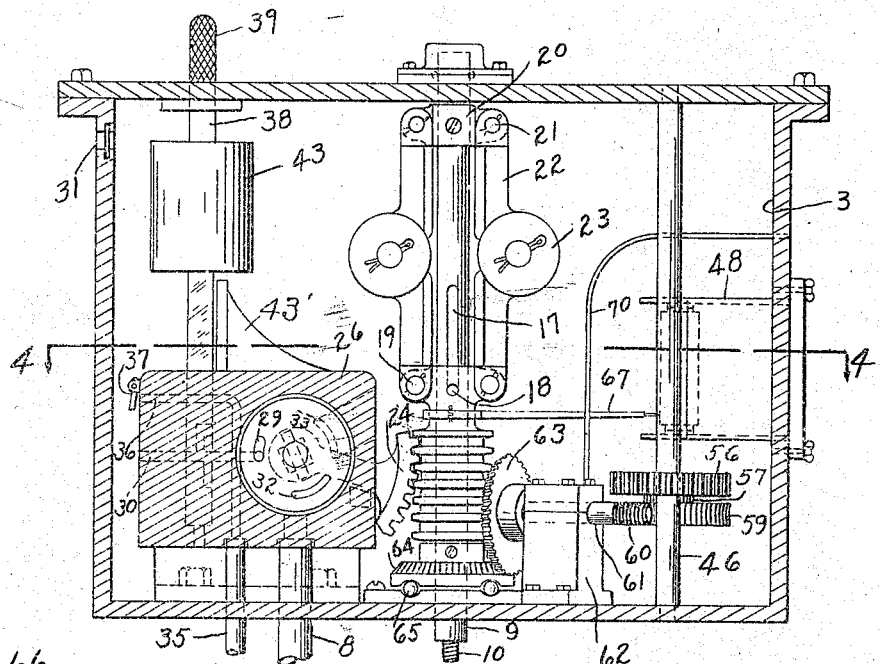
Fig. 3 is a view similar to Fig. 2 showing the position of the mechanism before an effective brake application.

As before stated any movement of the valve disk 28 sufficient to bring this port 32 into partial registration with the exhaust 33 is sufficient to carry the port 29 out of registration with the exhaust passage 30 so that under these conditions the pressure from the train line pipe is vented through passage 33 into the cab box. The escape of the pressure through the vent opening 31 in the cab box continues until the engineer manipulates certain apparatus in the cab whereby to reclose the valve in the engine box 2 controlling the pressure in the train line pipe. The passage 36 consists of two separate bores, one connecting with the pipe 35 and the other delivering to the interior of the box 3, and a connecting port or passage $36^1$ formed transversely through the voluntarily operable gravity plunger 38. In the position of the parts shown in Fig. 3, the port $36^1$ through the plunger registers with the separate bores constituting the passage 36. When the plunger is raised to the position of Fig. 2, the port 36¹ is moved out of registry with said bores, as indicated in dotted lines, and the upper end of the by-pass 44 makes communication with that bore of the passage 36 leading to pipe 35 and the lower end of said by-pass makes communication with the passage 30. That portion of the passage 36 leading to the interior of the box is therefore closed by a wall of the plunger by-pass 44, thereby preventing escape of pressure therethrough into the box, so that full pressure is transferred from pipe 8 to pipe 35.

This resetting may be effected from the cab or if desired the construction may be such as to require the engineer to descend from the cab and manually reclose the valve in the box 2 which controls the train line pressure. In the present invention we have shown a construction for reclosing said valve from the cab and by means of the train line pressure itself. This resetting apparatus consists of a resetting cylinder 34 on the engine box 2 and a sliding piston therein disposed when pressure is admitted thereagainst to effect a resetting of the rock shaft carrying the trip arm 5. The piston 34¹ coöperates with a roll or equivalent device 34² on a portion of the rock shaft upon which the trip arm 5 is mounted to rotate said shaft in reverse direction to its direction of actuation upon admission of pressure into the cylinder from pipe 35. This rotation of the shaft automatically releases the valve in the box 2 which controls the train line pressure, permitting said valve to automatically reclose and shut-off the train line pressure. The piston 34¹ is automatically returned to original position after each actuation by a coil spring 34³ arranged within the cylinder 34 to react against said piston. The trip arm 5 itself returns by gravity to its normal pendent position after each actuation by a track obstacle, but this return does not affect the position of the train line pressure control valve.

Leading from the resetting cylinder 34 to the casting 26 is a pipe 35 which has connection with the interior of the cab box 3 by means of an intake passage 36 cored through the casting 26. The intake end of the passage 36 is covered by a flap valve 37 the purpose of which is to prevent the air exhausted through either the passage 30 or the passage 33 from entering the intake passage 36 and effecting an operation of the piston in the resetting cylinder.

The passage 36 is positively placed in communication with the train line pressure by means of a by-pass in a gravity plunger 38 conveniently disposed for operation by the engineer. The plunger 38 is guided through the top wall of the cab box and has an exposed operating end 39. The opposite end of the plunger is received in a guide bore 40 cored vertically through the casting 26. The bore 40 has a vent 41 opening into the cab box 3 to permit the plunger to be reciprocated in the bore against the suction created by reason of the presence of pressure within the box 3 and which would, were the bore 40 closed at this end, be sufficient to prevent reciprocation of the plunger. Above the top face of the casting 26 the plunger is squared as indicated at 42. This squared portion 42 coöperates with a guide lug 43' formed on the top face of the casting to prevent turning movement of the plunger in the bore 40. Beyond the squared portion 42, the plunger has a weight 43 the normal tendency of which is to keep the plunger in non-resetting position. The plunger is lifted against the weight 43 when it is desired to reset the tripper 5 and returns by gravity as soon as the lifting influence is removed.

That end of the plunger which is received in the bore 40 is provided with a passage 44. In the normal position of the parts shown in Fig. 3, both ends of the passage 44 are closed by a wall of the bore 40. In this position a portion of the passage 44 registers with the exhaust passage 30 so that the air is exhausted from the valve chamber 27 through the cross portion of the passage 44 and out into the cab box 3 through the opposite end of the passage 30. When the train line pipe has been vented by an actuation of the trip 5 on a train traveling at a speed insufficient to destroy registry of the vent 29 with the port 30. The trip 5 is reset by the engineer raising the resetting plunger 38 to the position shown in Fig. 2. This brings the lower end of the passage 44 into registration with passage 30 of the valve chamber 27 and the outer end of the passage 30 is closed by the new position of the plunger.

The pressure admitted through the pipe 8 into the valve chamber 27 therefore passes through passages 44 and 36 to the pipe 35 connecting with the resetting cylinder and moves the piston in the cylinder to cause a resetting movement of the rock shaft carrying the trip arm 5. The construction of the passage 44 is such that that end of the passage 36 controlled by the flap valve 37 is closed by the wall of the passage 44, and air must therefore take outlet through passage 36 to pipe 35.

Where the speed of the train at the time the trip arm 5 is actuated is sufficient to destroy the registry of vent 29 and passage 30, the exhaust of the pressure is through the registering ports 32 and 33 and the port 29 is closed (see Fig. 2). As soon as the speed of the train is reduced by the application of the brakes, the slide 16 lowers and through the connections 23—24 moves the valve disk 28 back to the position of Fig. 3 in which the port 29 registers with the passage 30. The resetting plunger is then lifted to cause its passage 44 to establish communication between port 29 and passage 36 (see Fig. 2) so that the pressure automatically recloses the train line pressure control valve in the box 2. When said valve is again closed, the engineer releases the plunger 38 which returns by its own weight and carries its passage 44 out of registry with the passage 36 and back to the position shown in Fig. 3. This resetting apparatus therefore prevents all possibility of the engineer restoring the rock shaft carrying the tripper 5 to its normal position, thus resetting valve and releasing brakes, until the train speed has been reduced to the predetermined limit.

In devices of this class it is desirable that the speed of a train be recorded in a permanent form so that a record may be kept showing the varying rates of speed at which a train has run on a particular trip. We have therefore provided in the present invention a speed recording apparatus which operates in conjunction with the mechanism for securing a speed varied application of the brakes. This apparatus consists essentially of a record sheet which is driven from the car axle at a related rate of speed to the speed of the car axle and a marking member associated therewith and movable relative to said record sheet by means of the sleeve 16 whereby to indicate the varying train speeds.

The record sheet may be a simple web of paper mounted in roll form on one roll 49 of a carrier and adapted to be wound from said roll to an oppositely disposed roll 50. The rolls 49 and 50 are arranged parallel to each other within a casing 48 removably mounted within the cab box 3. The casing 48 may be locked in any desired manner to prevent tampering therewith.

The rolls 49 and 50 are connected by pairs of spring tensioned arms 52 to each other and to a centrally disposed hard rubber roll 53. The spring for the arms 52 is indicated at 54 and connects the cross bar 55 of one set of arms with the corresponding cross bar of the opposite set of arms. This construction of carrier insures positive uniform feed of the paper web from one roll to the other and provides for a compensating action of the rolls 49 and 50 relative to each other, and of the intermediate roll 53 relative to the intermediate portion of the paper, whereby to maintain all the rolls in proper relation as the surface size of one roll increases and the other roll decreases. The carrier for the record sheet is therefore wholly removable from the casing to permit the record sheet to be changed.

The rolls 49 and 50 are driven at uniform speed by a friction drive consisting of a pair of spaced shafts 46 and 47, journaled in the cab box in superimposed relation to the rolls 49 and 50. The shafts 46 and 47 are rotated at a speed having a known relation to the speed of the axle. As a simple form of drive for said shafts, we have shown each shaft provided with a gear 56. The gears 56 are driven by a spur gear 57 disposed therebetween and meshing with both gears. The spur gear 57 is mounted on a shaft 58 which is driven by means of a gear 59 thereon meshing with a worm 60 on a drive shaft 61 journaled in a suitable bearing 62 rising from the bottom of the cab box 3. The opposite end of the shaft 61 has a bevel gear 63 thereon meshing with a bevel gear 64 on the driving shaft 9. The numeral 65 indicates a ball bearing for the gear 64. The driving connections just described therefore constitute a speed reducing drive for the record carrying rolls 49 and 50.

Figure 5:
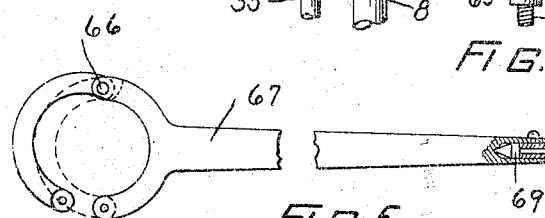
Fig. 5 is a detail view of the marking arm of the speed recording mechanism.

Mounted on the sliding sleeve 16 in any desired manner as by the hinged clamping construction 66 shown in Fig. 5 is a stylus carrying arm 67 carrying on its free end a marker 68 adapted to be moved across the record sheet 45 by the movement of the sleeve 16. The marker 68 may be of any desired type but is preferably a simple perforating wheel having a loose connection 69 with the free end of the arm 67. The joint 69 permits slight play of the marker 68 to compensate for the pitching effect of the train and thereby prevent tearing of the paper web 45. The arm 67 is guided in its movements relative to the sheet 45 in any manner as by the guide member 70.

Various modifications in the form and construction of our invention may be resorted to without departing from the spirit thereof if within the limits of the appended claims.

What we therefore claim and desire to secure by Letters Patent is:

1. In a device of the class described, an air brake system, a pressure relieving actuator therefor, a speed governed automatic controlling mechanism having a positive phase of service actuation up to a predetermined speed, and a phase of increasingly effective actuation beyond said speed, and a voluntarily operable pressure-actuated controlling device dominating the automatic controlling mechanism up to said predetermined speed but non-operable above said speed.

2. In a device of the class described, an air brake system, a pressure relieving actuator therefor, a speed governed automatic controlling mechanism having a positive phase of service actuation up to a predetermined speed and a phase of increasingly effective actuation beyond said speed, a voluntarily operable pressure-actuated controlling device dominating the automatic controlling mechanism up to said predetermined speed, but non-operable above said speed, and voluntarily operable means for applying said pressure to reset said pressure relieving actuation.

3. In a system of train control, a normally closed pressure system, a trip for opening said system, a speed governed relief mechanism for said system, effective upon actuation of said trip, and voluntarily operable means for utilizing said pressure to reclose said pressure system after an effective actuation of said trip.

4. In a system of train control, a normally closed pressure system, a trip for operating said system, a speed governed relief mechanism for said system effective upon actuation of said trip, said relief mechanism having a phase of venting movement effective to cause a brake application in proportion to the train speed when said speed exceeds a predetermined speed, and means for utilizing said pressure to reclose said pressure system voluntarily operable only when the speed is reduced to said predetermined point.

5. In a system of train control, a normally closed pressure system, a trip for opening said system, speed governed means for relieving said system upon actuation of said trip, said means effective at all speeds below a predetermined maximum train speed to cause a predetermined minimum brake application and effective at speeds above said predetermined speed to cause a brake application in proportion to the speed of the train, and voluntarily operable means for utilizing said pressure to reclose said pressure system after said brake application has reduced the train speed to said predetermined speed.

6. In a system of train control, a normally closed pressure system, a train carried trip for opening said system, a speed governed means operable upon actuation of said trip and effective at speeds in excess of a predetermined speed to relieve said system and cause a speed governed brake application, and voluntarily operable means for utilizing said pressure to reclose said pressure system, said last named means ineffective to reset said trip until the train speed is reduced to said predetermined speed.

7. In a system of train control, in combination, a track obstacle, a train carried trip disposed for actuation thereby, speed governed means for relieving the pressure in the train line system upon an effective actuation of said trip, means for utilizing said pressure to reclose said pressure system; said resetting means effective below a predetermined train speed and non-effective above said predetermined speed.

8. In a train stop mechanism, a valve controlling the pressure in the train line system and having a venting position for train speeds less than a predetermined speed effective to cause a predetermined minimum brake application, and a venting position for train speeds in excess of said predetermined speed, effective to cause a brake application in proportion to the train speed, a speed governed actuating mechanism for said valve, and a resetting mechanism for said valve effective below said predetermined speed only.

9. In a train stop mechanism, a valve controlling the pressure in the train line system and having a venting position for train speeds less than a predetermined speed effective to cause a predetermined minimum brake application and an independent venting position for train speeds in excess of said predetermined speed, effective to cause a brake application in proportion to the train speed, a speed governed actuating mechanism for said valve, and a voluntarily operable control device dominating said valve up to said predetermined speed but non-operable above said speed.

10. In train stop mechanism, a speed governed relief mechanism for the pressure in the train line system effective at speeds in excess of a predetermined speed to cause a brake application and including a member rotating at train speed, a centrifugally acting device operatively connected with said member, a member actuated by said centrifugally acting device, a valve controlling the degree of venting of said system, operative connections from said member actuated by the centrifugally acting device to said valve effective to actuate said valve upon an operation of said centrifugally acting device, and a voluntarily operable control device dominating said valve up to said predetermined speed but non-operable above said speed.

11. In train stop mechanism, a speed governed relief mechanism for the pressure in the train line system effective at speeds in excess of a predetermined speed to cause a brake application and including a member rotating at train speed, a centrifugally acting device operatively connected with said member, a member actuated by said centrifugally acting device, a valve controlling the degree of venting of said system, operative connections from said member actuated by the centrifugally acting device to said valve effective to actuate said valve upon an operation of said centrifugally acting device, and a resetting mechanism for said valve ineffective until said train speed is reduced to said predetermined speed.

12. In train control mechanism, a normally closed pressure system, a trip member for opening said system, a speed governed relief mechanism for said system, effective upon actuation of said trip to vent said system, said relief mechanism having a degree of venting movement, effective to cause a predetermined minimum brake application at train speeds below a predetermined speed, and effective to cause a brake application proportionate to train speed at speeds in excess of said predetermined speed, and a voluntarily operable control device ineffective to influence said pressure system above said predetermined speed but effective below said predetermined speed to close said pressure system.

13. In train control mechanism, a normally closed pressure system, a trip member for opening said system, a speed governed relief mechanism for said system including a valve having a venting position for train speeds less than a predetermined speed effective to cause a predetermined minimum brake application and having a venting position for train speeds in excess of said predetermined speed effective to cause a brake application in proportion to the train speed, and a voluntarily operable control device effective up to said predetermined speed to close said pressure system and non-effective above said predetermined speed but becoming effective upon operation thereof as soon as the train speed is reduced to said predetermined speed to close said system.

14. In combination with a normally closed pressure system, a trip for opening said system, a speed governed relief mechanism for said system, having a normal minimum venting relation to said system when said system is opened below a predetermined maximum train speed, and having an increasing venting relation to said system when said system is opened above said predetermined maximum effective to cause a brake application in proportion to said train speed at the moment of opening said system, and manually operable mechanism for reclosing said system operable only when said train speed is below said predetermined maximum.

15. In combination with a normally closed pressure system, a trip for opening said system, a speed governed relief mechanism for said system including a control member having a normal minimum venting relation to said system when said system is opened below a predetermined maximum train speed and said venting relation effective to cause a predetermined minimum brake application and having an increasing venting relation to said system when said system is opened above said predetermined maximum speed effective to cause a brake application in proportion to the train speed at the moment of opening the system, and a voluntarily operable device operable only when the train speed is below said predetermined maximum and having a normal relation to said minimum venting phase of the control member effective to permit venting thereof and having a system reclosing relation thereto effective to destroy said venting relation and reclose said system.

16. In a train control mechanism, a normally closed pressure system, a releasable control device therefor, a relief mechanism for said system including a chamber connecting with said system and having a pair of independent vent passages, a control member in said chamber having a pair of vent openings each disposed for registration with a vent passage, and the relation of said vent openings to each other being such that one opening and one passage is always registered in any position of the control member, and speed governed means for varying the position of the control member.

17. In a train control mechanism, a normally closed pressure system, a releasable control device therefor, a relief mechanism for said system including a chamber connecting with said system and having a pair of independent vent passages, a control member in said chamber having a pair of vent openings each disposed for registration with a vent passage upon actuation of said member, one of said vent openings and one of said passages normally registering and the relation of said vent openings to each other being such that one opening and one passage is always registered in any position of the control member, speed governed means for varying the position of said control member, and a system reclosing device having a normal relation to said vent openings effective to establish venting communication between one of said openings and its passage, and having an operated relation to said opening effective to destroy said venting communication and divert the pressure to reclose the system.

18. In a train control mechanism, a normally closed pressure system, a releasable control device therefor, a relief mechanism for said system including a chamber connecting with said system and having a pair of independent vent passages, a control member in said chamber having a pair of vent openings each disposed for registration with a vent passage upon actuation of said member, speed governed means for varying the position of said control member and a voluntarily operable system reclosing device having a normal relation to said vent openings and its passage, and having an operated relation to said opening effective to destroy said venting communication and divert the pressure to reclose the system.

19. In train control mechanism, a normally closed pressure system, a releasable control device therefor, means for reclosing said system after release of said control device, a relief mechanism for said system when opened including a member having an intake chamber communicating with said system, a pair of independent vent passages, and a return passage communicating with said system reclosing means, a control member in said chamber having a minimum venting port normally registering with one of said vent passages, and a maximum venting port disposed for registration with the other venting passages upon actuation of the control member, speed governed means for varying the position of said control member, to bring said maximum venting port into registry with its venting passage and temporarily destroy the venting relation of said minimum venting port, and a device for actuating said system reclosing mechanism effective upon operation thereof to connect said minimum venting port with said return passage to the system reclosing means and destroy the venting relation of said minimum venting port and its passage.

20. In train control mechanism, a normally closed pressure system, a releasable control device therefor, means for reclosing said system after release of said control device, a relief mechanism for said system when opened including a member having an intake chamber communicating with said system, a pair of independent vent passages, and a return passage communicating with said system reclosing means, a control member in said chamber having a minimum venting port normally registering with one of said vent passages, and a maximum venting port disposed for registration with the other venting passages upon actuation of the control member, speed governed means for varying the position of said control member, to bring said maximum venting port into registry with its venting passage and temporarily destroy the venting relation of said minimum venting port, said minimum and maximum venting ports being so related to their venting passages and to each other that one port and one passage are always registered in any position of the control member, and a device for actuating said system reclosing mechanism comprising a movable member having a passage normally disposed to establish communication between said minimum venting port and its passage and arranged upon operation of said device to connect said port with said return passage to the system reclosing means and destroy the venting relation of said minimum venting port and its passage.

21. In train control mechanism, a normally closed pressure system, a releasable control device therefor, means for reclosing said system after release of said control device, a relief mechanism for said system when opened including a member having an intake chamber communicating with said system, a pair of independent vent passages, and a return passage communicating with said system reclosing means, a control member in said chamber having a minimum venting port normally registering with one of said vent passages, and a maximum venting port disposed for registration with the other venting passage upon actuation of the control member, speed governed means for varying the position of said control member, to bring said maximum venting port into registry with its venting passage and temporarily destroy the venting relation of said minimum venting port only when the train speed exceeds a predetermined maximum and permitting said control member to return to normal position as soon as the train speed is reduced to said predetermined maximum, said minimum and maximum venting ports being so related to their venting passages that one port and one passage are always registered in any position of the control member, and a voluntarily operable device for actuating said system reclosing mechanism having a normal relation effective to establish communication between said minimum venting port and its passage and arranged upon operation of said device to connect said port with said return passage to the system reclosing means and destroy the venting relation of said minimum venting port and its passage.

22. In train control mechanism, a normally closed pressure system, a releasable control device therefor permitting said system to be opened when released, means for reclosing said system after it has been opened, a relief mechanism for said system when opened including a pressure receiving receptacle adapted to be placed in communication with the pressure system when said system is opened, a pair of independent vent passages and a return passage to said system reclosing means, a control member in said receptacle having independent ports adapted for registration with said venting passages, a speed governed actuating mechanism therefor, one port and one venting passage of said relief mechanism normally registering and the other port and passage registering only upon actuation of said control member when the train exceeds a fixed maximum and temporarily destroying the registration of said first named port and passage and said registration automatically reestablished by the reduction of the train speed to a point below said fixed maximum, and means effective only when venting communication between the normally registering port and its passage is established and arranged when operated to destroy said venting relation and to divert the pressure from said port to said return passage leading to the system reclosing means.

23. In train control mechanism, a normally closed pressure system, a releasable control device therefor permitting said system to be opened when released, means for reclosing said system after it has been opened, a relief mechanism for said system when opened including a pressure receiving receptacle adapted to be placed in communication with the pressure system when said system is opened, a pair of independent vent passages and a return passage to said system reclosing means, a control member in said receptacle having independent ports adapted for registration with said venting passages, a speed governed actuating mechanism therefor including a member rotating at train speed, a control actuating member thereon, a device for raising said member in proportion to the train speed, and a member engaging said control actuating member and operatively connected with said control member, and means effective only when the train speed is below said predetermined maximum to divert the pressure into said return passage leading to the system reclosing means.

24. In train control mechanism, a normally closed pressure system, a releasable control device therefor permitting said system to be opened when released, means for reclosing said system after it has been opened, a relief mechanism for said system when opened including a pressure receiving receptacle placed in communication with the pressure system when said system is opened, a pair of independent vent passages and a return passage to said system reclosing means, a control member in said receptacle having independent ports adapted for registration with said venting passages, a speed governed actuating mechanism therefor including a member rotating at train speed, an actuating member thereon consisting of a plurality of spaced lifting elements, a centrifugally acting device for raising said member in proportion to the train speed, and a member engaging said elements of the lifting member and operatively connected with said control member, one port and one venting passage of said relief mechanism normally registering and the other port and passage registering only upon actuation of said control member when the train exceeds said fixed maximum, said actuation temporarily destroying the registration of said first named port and passage and said registration automatically reëstablished by the reduction of the train speed to a point below said fixed maximum, and a voluntarily operable gravity plunger effective only when said venting communication between the normally registering port and its passage is established and having a bypass arranged upon actuation of the plunger to destroy said venting relation and to divert the pressure from said port to said return passage leading to the system reclosing means.

25. In train control mechanism, a normally closed pressure system, a releasable control device therefor, a reclosing mechanism, an automatic relief mechanism for said system when opened including a minimum and a maximum venting passage and a control member having a minimum and a maximum venting port registrable with said passages respectively, a resetting device having an effective position normally disposed to permit venting of said minimum port through its passage, and closing said passage when operated and diverting the pressure from said port back to the system reclosing mechanism.

26. In train control mechanism, a normally closed pressure system, a releasable control device therefor, a reclosing mechanism, a speed governed automatic relief mechanism for said system when opened including a minimum and a maximum venting passage and a control member having a minimum and a maximum venting port registrable with said passages respectively, a voluntarily operable resetting device having a normal relation to said ports effective to permit venting of said minimum port through its passage, and closing said passage when operated and diverting the pressure from said port back to the system reclosing mechanism.

27. In train control mechanism, a normally closed pressure system, a releasable control device therefor, a reclosing mechanism, a speed governed automatic relief mechanism for said system when opened including a minimum and a maximum venting passage and a control member having a minimum and a maximum venting port registrable with said passages respectively, a gravity operating resetting plunger having a bypass normally disposed to permit venting of said minimum port through its passage, and closing said passage when said plunger is operated and diverting the pressure from said port back to the system reclosing mechanism.

28. In train control mechanism, a normally closed pressure system, a releasable control device therefor, a speed governed relief mechanism for said system when opened including a minimum and a maximum venting passage and a control member having a normal minimum venting phase and a maximum venting phase when actuated, and an actuating mechanism for said member including a member rotating at train speed, a member rotating therewith and removable relative thereto, a centrifugally acting device associated with said rotatable member and operatively connected with said movable member to cause independent movement thereof relative to the rotating member, and power transmitting connections between said movable member and said control member effective to actuate said control member upon movement of said movable member.

29. In train control mechanism, a normally closed pressure system, a releasable control device therefor, a speed governed relief mechanism for said system when opened including a minimum and a maximum venting passage and a control member having a normal minimum venting phase and a maximum venting phase when actuated, and an actuating mechanism for said member including a shaft rotating at train speed, a member rotating with said shaft and slidable therealong, a centrifugally acting device associated with said slidable member to cause sliding movement thereof, spaced lifting elements on said slidable member, and a member having spaced engaging elements disposed for engagement with said lifting elements and operatively connected with said control member.

30. In a train control mechanism, a normally closed pressure system, a releasable control device therefor, a speed governed relief mechanism for said system when opened including a minimum and a maximum venting passage and a control member having a normal minimum venting phase and a maximum venting phase when actuated, and an actuating mechanism for said member including a shaft rotating at train speed, a member rotating with said shaft and slidable therealong, a centrifugally acting device associated with said shaft and operatively connected with said slidable member to cause sliding movement thereof, a plurality of spaced concentric rings on said sliding member and a segmental gear disposed for engagement with said rings and operatively connected with said control member.

31. In train stop mechanism, a trip disposed for actuation by a track obstacle to open the air pressure system of a train at any and all train speeds, and a relief controlling mechanism operatively connected with the exhaust of said system and normally effective to permit a predetermined minimum brake application upon an effective actuation of said trip and having a positive phase of service application up to a predetermined train speed, and a phase of increasingly effective actuation beyond said predetermined speed.

32. In train stop mechanism, a trip disposed for actuation by a track obstacle to open the air pressure system of a train at any and all train speeds, and a speed-governed relief controlling mechanism operatively connected with the exhaust of said system and normally effective to permit a predetermined minimum brake application upon an effective actuation of said trip, and having a positive phase of service application up to a predetermined train speed, and a phase of increasingly effective actuation beyond said predetermined speed.

33. In train stop mechanism, a trip disposed for actuation by a track obstacle to open the air pressure system of a train at any and all train speeds, and a relief controlling mechanism operatively connected with the exhaust of said system and normally effective to permit a predetermined minimum brake application upon an effective actuation of said trip, and having a positive phase of service application up to a predetermined train speed, and a phase of increasingly effective actuation beyond said predetermined speed, and a voluntarily operable controlling device dominating the automatic relief mechanism up to said predetermined speed, but non-operable above said speed to reset said trip and close said system.

34. In train stop mechanism, a trip disposed for actuation by a track obstacle to open the air pressure system of a train at any and all train speeds, and a relief controlling mechanism operatively connected with the exhaust of said system and normally effective to permit a predetermined minimum brake application upon an effective actuation of said trip, and having a positive phase of service application up to a predetermined train speed, and a phase of increasingly effective actuation beyond said predetermined speed, and a voluntarily operable pressure-actuated controlling device dominating the automatic relief mechanism up to said predetermined speed but non-operable above said speed to reset said trip and close said system.

35. In train stop mechanism, a trip disposed for actuation by a track obstacle to open the air pressure system of a train at any and all train speeds, and a relief controlling mechanism operatively connected with the exhaust of said system and normally effective to permit a predetermined minimum brake application upon an effective actuation of said trip, and a voluntarily operable controlling device dominating the automatic relief mechanism up to said predetermined speed but non-operable above said speed to reclose said system.

36. In train stop mechanism, a trip disposed for actuation by a track obstacle to open the air pressure system of a train at any and all train speeds, and a relief controlling mechanism operatively connected with the exhaust of said system and normally effective to permit a predetermined minimum brake application upon an effective actuation of said trip, and a voluntarily operable controlling device dominating the automatic relief mechanism up to said predetermined speed but non-operable above said speed and utilizing said exhaust pressure to reclose said system.

37. In train stop mechanism, a trip disposed for actuation by a track obstacle to open the air pressure system of a train at any and all train speeds, and a relief controlling mechanism operatively connected with the exhaust of said system and normally effective to permit a predetermined minimum relief of said pressure system upon an effective actuation of said trip, and having a positive phase of pressure relief up to a predetermined train speed, and a phase of increasingly effective pressure relief beyond said predetermined speed, and a voluntarily operable controlling device dominating the relief mechanism up to said predetermined speed but non-operable above said speed to reclose said system.

38. In automatic train control mechanism, means for relieving the pressure of the braking system of a train effective upon contact with a roadway obstacle when the train is moving at a speed below a predetermined rate to apply the brakes to a determined degree and having an increasingly proportionate phase of operation upon the brakes as the train speed increases above said predetermined rate, and manually operable means for closing said pressure relief means and releasing the brakes operable only when the train speed does not exceed said predetermined rate.

39. In automatic train control mechanism, means for relieving the pressure of the braking system of a train effective upon contact with a roadway obstacle when the train is moving at a speed below a predetermined rate to apply the brakes to a determined degree and having an increasingly proportionate phase of operation upon the brakes as the train speed increases above said predetermined rate, and manually operable means for utilizing the pressure to close said pressure relief means and releasing the brakes operable only when the train speed does not exceed said predetermined rate.

40. In a device of the class described, an air brake system, a pressure relief actuator therefor, a speed governed automatic relief controlling mechanism operatively associated with said actuator to vary the degree of relief, a voluntarily operable engineer's control device dominant of the relief controlling mechanism, but dominated by said speed governed automatic control device.

41. In a train control system, a relief mechanism, an automatic speed governed relief control mechanism, and an engineer's relief control device dominated by said speed governed mechanism at speeds above a predetermined minimum speed and dominating said mechanism below said minimum speed.

42. In a train control system, in combination an air brake system relief valve adapted to be opened by effective actuation of a track obstacle set at actuating position, an automatic speed governed relief mechanism associated with said valve to vary the degree of relief upon actuation thereof and operating at speeds below a predetermined minimum train speed to bring the train to a stop, and at speeds above said predetermined speed to initially reduce the train speed to said predetermined speed and eventually bring the train to a stop unless overcome by operation of a permissive control device, and a permissive control device effectively operable only when the train speed has been reduced to or below said predetermined speed to permit the train to proceed past a track obstacle set at actuating position.

43. In a train control system, an air brake system relief valve adapted to be opened by effective actuation of a track obstacle, an automatic speed governed control mechanism associated with said brake system relief valve and effective to vary the degree of relief, and a voluntarily-operable engineer's control device for reclosing said valve, said device dominated by said speed governed mechanism at speeds above a pretermined minimum speed to prevent reclosing of said valve and dominating said mechanism at and below said minimum speed to permit said valve to be reclosed.

44. In a train control system, an air brake system relief valve adapted to be opened by effective actuation of a track obstacle, an automatic speed-governed control mechanism associated with said brake system relief valve and operating to vary the degree of relief upon actuation thereof, and a voluntarily-operable engineer's control device operatively connectible with the train line pressure and utilizing said pressure to reclose the air brake system relief valve, said device dominated by said speed governed mechanism at speeds above a predetermined minimum speed to prevent reclosing of said valve and dominating said mechanism at and below said minimum speed to permit said valve to be reclosed through the agency of the train line pressure.

45. In a train control system, an air brake system, a pressure relief actuator therefor, a speed-governed automatic control device operatively associated with said actuator to vary the degree of relief, and means for rendering void the action of said pressure relief actuator, but dominated by said speed governed control device.

46. In a train control system, an air brake system, a pressure relief actuator therefor, a speed-governed automatic control device operatively associated with said actuator to vary the degree of relief, and means, manually operable by the engineer but dominated by said speed governed control device for rendering void the action of said pressure relief actuator.

In testimony whereof we affix our signatures in presence of two witnesses.

HERBERT R. NEVENS.
RICHARD MARCY.

Witnesses:
MARION C. HOBBS,
VICTORIA LOWDEN.